2,558,161

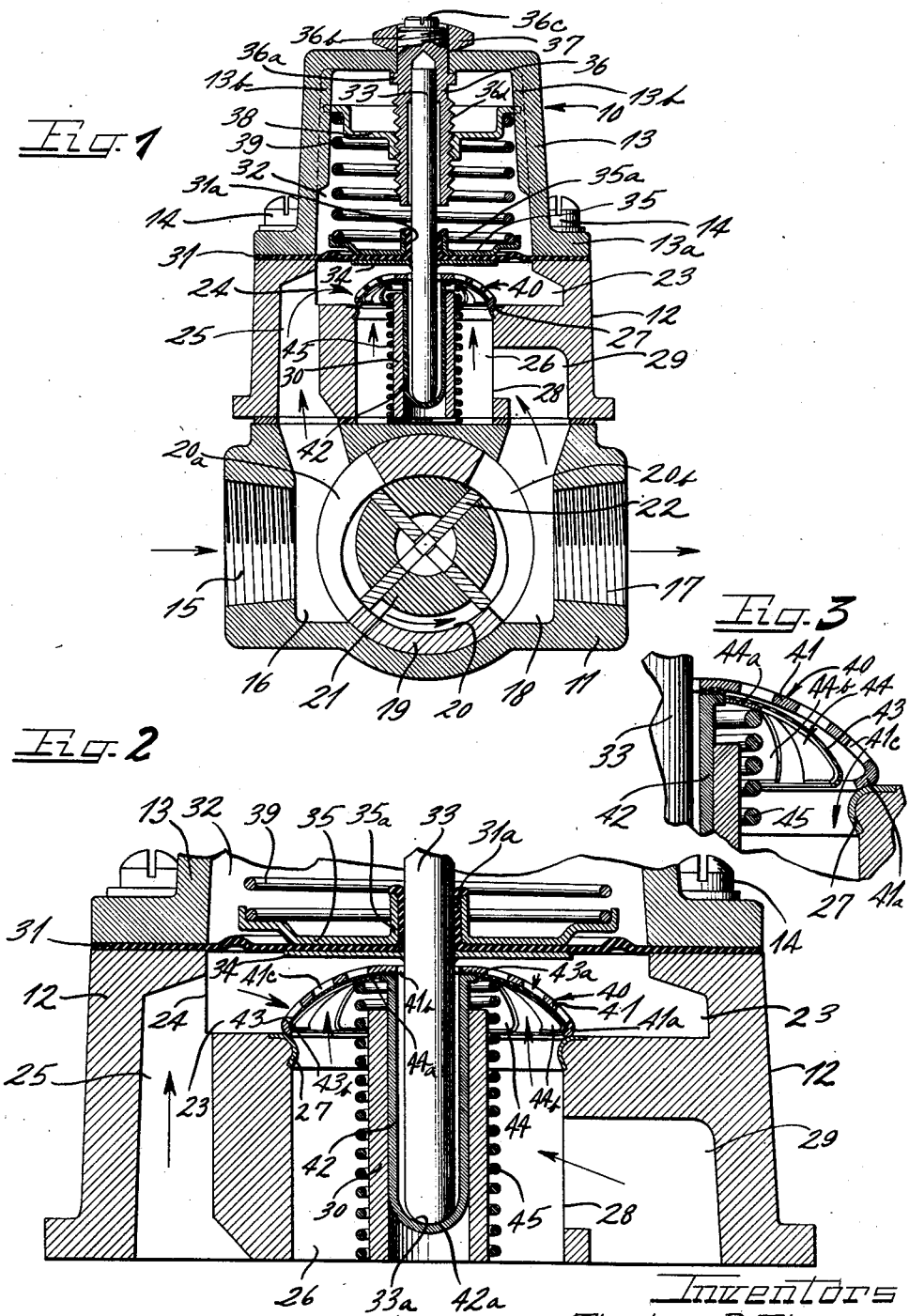

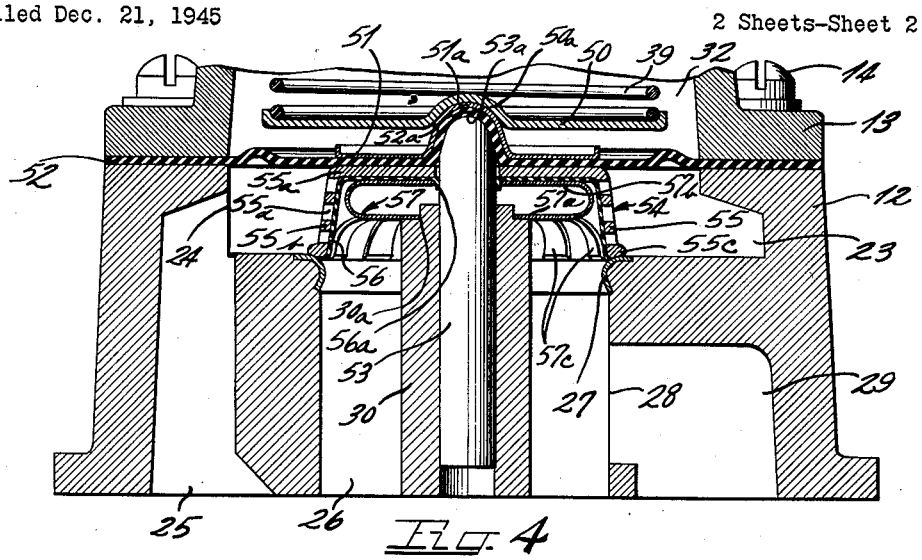
Fig. 4
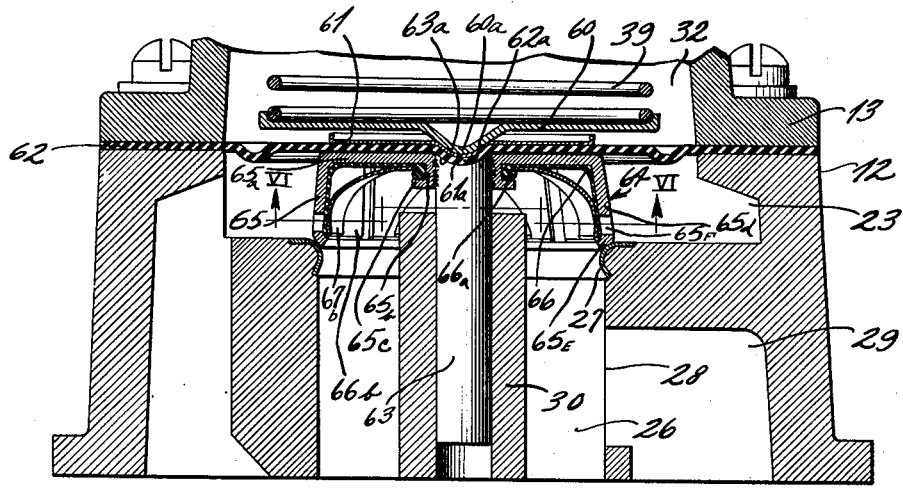
Fig. 5
Fig. 6
Inventors
Theodore R. Thoren
Leslie L. Aspelin Patented June 26, 1951

UNITED STATES PATENT OFFICE 2,558,161

VALVE ASSEMBLY

Theodore R. Thoren, Cleveland, and Leslie L. Aspelin, Cleveland Heights, Ohio, assignors to Thompson Products, Inc., Cleveland, Ohio, a corporation of Ohio Application December 21, 1945, Serial No. 636,450

17 Claims. (Cl. 277—45)

This invention relates to valve constructions especially adapted for pumps and the like fluid transfer devices.

Specifically, the invention relates to combined by-pass and relief valve constructions for pumps wherein the relief valve has a dome portion or hollow head with a depending seating rim and an elongated stem extending to the top of the head for increased bearing engagement with a supporting bearing to better hold the valve against cocking. The interior of the dome or hollow head of the relief valve carries flexible sheet material such as rubber for closing apertures in the relief valve head, but adapted to be deflected from the apertures to by-pass fluid through the valve head even when the rim of the valve is seated.

The invention will hereinafter be specifically described as embodied in an aircraft fuel pump, but it should be understood that the valve constructions of this invention are not limited to such usage since they are adapted for general usage in the relief of fluid pressure and in the by-passing of fluid.

Aircraft fuel systems preferably have fuel pumps arranged in series or tandem to insure delivery of fuel to the engine even in the event of failure of one of the pumps. In such systems the pumps are equipped with by-pass valves to permit passage of fuel through the inoperative pump.

Further, in such aircraft fuel systems, it is desirable to maintain a constant fuel pressure at the carburetor of the airplane engine based on ambient air pressure or supercharger pressure such as exists in the intake manifold of the engine. Since the pumps may deliver fluctuating pressures, a relief valve mechanism is provided which will vent excess pressures back to the intake side of the pump. The relief valve is set to maintain any desired pump pressure. An adjustable spring load on the relief valve is provided for this purpose. A diaphragm arrangement is also provided to be subjected to pump discharge pressure on one side thereof and ambient air or supercharger pressure on the other side thereof. This diaphragm arrangement automatically compensates for fluctuations in the air and fuel pressures so that the discharge pressure of the pump is controlled entirely by the adjustable spring means.

In accordance with this invention, combined relief valve and by-pass valves are provided wherein the relief valve has a dome or hollow head portion to which is attached an elongated guide stem. The dome or hollow head makes possible the use of a longer guide stem without increasing the overall height of the assembly since the stem can project into the hollow head or dome and thereby be of increased length to afford a longer bearing support for the valve. This holds the valve against cocking and insures a good seating of the valve.

In addition, the hollow head or dome of the relief valve, according to this invention, receives a deformable by-pass valve therein. This valve can take the form of a flexible impervious sheet composed, for example, of synthetic rubber-impregnated fabric, flexible plastic material, or the like. The head or dome of the relief valve is apertured and these apertures are closed by the by-pass valve whenever pressure on the discharge side of the pump is greater than pressure on the intake side of the pump. However, when the intake pressure exceeds the discharge pressure, the by-pass valve will be deflected from the apertures in the relief valve to permit fluid flow through the relief valve even when the valve is closed. In this manner, fluid can be by-passed around an inoperative pump.

It is, then, an object of this invention to provide a valve assembly with a hollow head or dome and a depending guide stem affording an increased guide length without increasing the overall height of the assembly.

Another object of the invention is to provide a combined relief and by-pass valve assembly wherein a hollow head apertured relief valve receives, in the hollow head thereof, a deformable by-pass valve controlling flow through the apertures.

A still further object of this invention is to provide a combined relief and by-pass valve for pumps and the like wherein the relief valve has a hollow head and a depending elongated guide stem affording ample support for the valve to hold the valve against cocking and wherein the hollow head of the valve receives by-pass control means, without increasing the overall height of the assembly.

Another object of the invention is to provide a relief valve with a guide stem that projects on both sides of the seating face of the valve to afford increased bearing support for the valve without increasing the overall height of the assembly.

A further object of the invention is to provide a relief valve with a flexible diaphragm type by-pass control.

A still further object of the invention is to provide a combined relief and by-pass valve including a dome type relief valve with an annular seating face therearound and a by-pass valve in the dome of the relief valve arranged to deflect for accommodating fluid flow through apertures in the dome of the relief valve.

A still further object of the invention is to provide a pump relief valve arrangement wherein the stem guide for the valve projects into the head of the valve above the seating face of the valve.

A still further object of the invention is to provide a combined relief and by-pass valve including an apertured relief valve head with a seating face therearound and a diaphragm type spring pressed by-pass valve controlling flow through the apertures in the relief valve.

Other and further objects of this invention will be apparent to those skilled in the art from the following detailed description of the annexed sheets of drawings which, by way of preferred examples only, illustrate three embodiments of the invention.

On the drawings:

Figure 1 is a vertical cross-sectional view taken through an aircraft fuel pump equipped with a combined relief and by-pass valve according to this invention.

Figure 2 is an enlarged fragmentary vertical cross-sectional view further illustrating the pump and valve of Figure 1.

Figure 3 is a fragmentary vertical cross-sectional view illustrating the manner in which fluid flow is by-passed through the relief valve of Figures 1 and 2.

Figure 4 is a view similar to Figure 3 illustrating a second embodiment of a combined relief and by-pass valve according to this invention.

Figure 5 is a view similar to Figure 3 illustrating a third embodiment of a combined relief and by-pass valve according to this invention.

Figure 6 is a transverse horizontal cross-sectional view taken substantially along the line VI—VI of Figure 5.

As shown on the drawings:

In Figure 1 the reference numeral 10 designates generally an aircraft fuel pump including an open topped pump casing 11, an open ended valve casing 12, and an open bottomed spring casing 13, all held together in superimposed relation by means of bolts or studs 14.

The pump casing 11 has an internally threaded boss 15 at one end thereof communicating with an inlet chamber 16 in the casing. A second internally threaded boss 17 is provided at the other end of the casing 11 and communicates with a pump discharge chamber 18 in the casing.

A sleeve 19 is pressed in the casing 11 between the inlet chamber 16 and discharge chamber 18 and defines, with its inner surface, a pumping chamber 20 communicating at 20a with the inlet chamber 16 and at 20b with the discharge chamber 18.

A pump rotor 21 is eccentrically mounted for rotation within the sleeve 19 and has sliding vanes 22 cooperating with the inner surface of the sleeve to pump material from the inlet chamber 16 through the aperture or port 20a and through the aperture or port 20b into the outlet chamber 18.

The valve casing 12 has an open topped inlet chamber 23 communicating through a port 24 with a passageway 25 joined with the inlet chamber 16 of the casing 11.

A central open-ended chamber 26 of smaller diameter than the chamber 23 is provided in the casing 12. This chamber 26 is surrounded at its upper open end by a valve seat 27. A port 28 joins the chamber 26 with a passageway 29 opening into the discharge chamber 18 of the casing 11.

The casing 12 carries a tubular bearing or guide 30 in the center of the chamber 26. This guide projects through the open top of the chamber 26 into the central portion of the chamber 23, for a purpose to be hereinafter more fully described.

The casing 13 is in the form of an inverted cup with an outturned flange 13a around the bottom open end thereof receiving the bolts or studs 14 therethrough. A flexible diaphragm 31 composed of synthetic rubber-impregnated fabric or similar sheet material is clamped around its periphery between the outturned flange 13a of the casing 13 and the top of the casing 12. The diaphragm 31 separates the chamber 23 of the casing 12 from a chamber 32 in the casing 13.

A rod 33 extends through the center of the diaphragm 31 from the chamber 32 into the tubular stem guide 30 in the chamber 26. A washer or flange providing member 34 underlies the central portion of the diaphragm 31 and is affixed to the rod 33 as by means of brazing, welding or the like.

A spring retainer 35 overlies the central portion of the diaphragm 31 in the chamber 32 and has a central collar portion 35a receiving a neck portion 31a of the diaphragm therethrough to sealingly clamp the central portion of the diaphragm to the rod 33 and to cooperate with the welded bond holding the washer 34 on the rod for compelling comovement of the diaphragm with the rod.

The upper end of the rod is slidably guided in a hollow post 36 depending from the top of the casing 13. This post 36 has a shoulder 36a engaging the underface of the top wall of the casing 13 and a threaded portion 36b projecting through an aperture in the top wall of the casing. A nut 37 is threaded on the threaded portion 36b and overlies the top wall of the casing to hold the post 36 in the chamber 32 in spaced relation above the diaphragm 31 and retainer 35. A screwdriver slot 36c is provided in the free end of the post portion 36b so that the post can be rotated. The depending portion of the post in the chamber 32 is externally threaded as at 36d and receives, in threaded relation therearound, an upper spring retainer 38. The spring retainer has an outturned peripheral flange which is notched to receive therein ribs 13b along the side wall of the casing 13. The retainer 38 is therefore held against rotation relative to the casing 13 but can slide up and down in the chamber 32 of the casing when the post 36 is rotated. A coil spring 39 is compressed between the retainers 35 and 38 in the chamber 32 and thus acts on the diaphragm 31 and post 33 to urge the same toward the chamber 23 of the casing 12.

A combined relief and by-pass valve assembly 40 controls flow around the pumping element of the pump 10 to relieve excess pressure from the discharge chamber 18 of the pump back to the inlet chamber 16 and to by-pass fluid from the inlet chamber 16 around the pumping element to the discharge chamber 18.

The valve assembly 40, best shown in Figures 2 and 3, is composed of a relief valve having a hollow domed head 41 with a rounded rim portion 41a for seating on the seat 27. A hollow stem 42 is welded, brazed, or otherwise affixed to the apex of the head 41 and depends around a central aperture 41b in the apex of the head. The stem 42 is slidably seated in the stem guide 30 and has a rounded closed bottom 42a. The rod 33 projects freely through the aperture 41b in the valve head 41 into the hollow stem 42 and is seated on the bottom 42a of the stem. Since the rod 33 is loaded by the spring 39, the rounded bottom end 33a of the rod acts on the rounded bottom 42a of the stem 42 for urging the seating face 41a of the valve head 41 against the seat 27. Since the head 41 of the relief valve is hollow and domed to provide an apex above the seating face 41a the stem guide 30 can project into the head of the valve and have an increased bearing length for the stem 42 without increasing the overall height of the assembly. Because of this arrangement, the relief valve is better guided for straight axial movement to hold the valve head 41 against cocking. In addition, the rod 33 acts on the very bottom of the valve stem 42 and the pressure of the spring 39 is applied to the relief valve at a level materially below the seating face 41a of the valve. This arrangement further minimizes possible cocking of the valve head 41. The rod 33 is spaced from the valve head 41 and hollow stem 42 and its rounded end 33a can rock on the rounded bottom 42a of the stem to accommodate cocking movement of the rod without imparting such movement to the valve head 41.

The valve head 41 is apertured between the seating face 41a and the central aperture 41b in the apex of the head as at 41c to accommodate by-passing of fluid from the chamber 23 into the chamber 26 even when the valve seating face 41a is seated on the seat 27. To control the by-passing of fluid through the apertures 41c of the valve head 41, a deformable diaphragm-type by-pass valve is provided. This valve includes a diaphragm sheet 43 lining the interior of the relief valve head 41. The sheet 43 can be composed of flexible or limp impervious material such as synthetic rubber-impregnated fabric, synthetic rubber sheet material, deformable plastic sheet material or the like. The diaphragm 43 is molded or deformed to closely hug the under surface of the relief valve 41 and to surround the stem 42 at the apex of the head 41. Thus the diaphragm 43 has a central aperture 43a receiving the valve stem 42 therethrough together with a depending rim portion 43b for seating on the inner surface of the rounded rim 41a of the valve head 41.

A radially deformable spring 44 holds the diaphragm 43 in sealing relation with the valve head 41 to close the aperture 41c. This spring 44 has an apertured central portion 44a seated around the apex end of the valve stem 42 and held against the valve head 41 by a coil spring 45 which surrounds the stem guide 30 and is bottomed on the top of the pump casing 11. A plurality of spring fingers 44b radiate from the central portion 44a and are contoured to hug the under surface of the diaphragm 43 for holding the diaphragm in sealing relation with the valve head 41. These fingers 44b are adapted to be deflected radially or inwardly whenever pressure in the apertures 41c of the valve head 41 exceeds a predetermined differential above the pressure on the underface of the diaphragm. In addition to deflection of the spring fingers 44b, the coil spring 45 can be compressed to permit the central portion 44a of the spring and the central portion of the diaphragm 43 to move away from the valve head. The apertures 41c of the valve head 41 will then accommodate fluid flow from the chamber 23 into the chamber 26, even though the valve head is seated on its seat 27.

In operation of the pump 10, the spring chamber 32 is vented to ambient air pressure or to intake manifold pressure of the aircraft engine and the spring 39 in this chamber is loaded to exert a predetermined load on the relief valve for urging the valve toward closed position. The pump is operated and the discharge pressure of the pump in the chamber 18 will exceed the intake pressure in the chamber 16. When the discharge pressure exceeds a predetermined differential over ambient air or intake manifold pressure, the relief valve will open to relieve excess pressure back to the inlet side of the pump. Thus, the valve head 41 will be unseated from the seat 27 and fluid will flow from the discharge chamber 18 through the passageway 29, port 28, chamber 26, into chamber 23, and thence through port 24 and passageway 25 into the inlet chamber 16. However, when pressure in the discharge chamber 18 is less than pressure in the inlet chamber 16 by a predetermined differential, the springs 44 and 45 will be deflected to uncover the apertures 41c in the valve head 41 and permit reverse fluid flow from the inlet chamber 16 to the discharge chamber 18.

In the embodiment of Figure 4, parts identical with parts described in connection with Figures 1 to 3 have been identified with the same reference numerals. As shown in Figure 4, the spring 39 is bottomed in a retainer 50 having a dimple 50a in the central portion thereof. A washer 51 is seated on the central portion of a diaphragm 52 separating the chambers 23 and 32 and clamped between the casing parts 12 and 13 as described hereinabove. The washer 51 has a raised convex portion 51a projecting into the dimple 50a and rockably supporting the spring retainer 50 so that cocking movements of the retainer 50 are not imparted to the washer 51.

A valve stem 53 slidably seated in the guide 30 has a rounded upper end 53a deflecting the central portion 52a of the diaphragm into the convex portion 51a of the washer 51 and thereby centering the washer on the diaphragm. In this embodiment, therefore, the diaphragm is not centrally apertured but is locally deflected and is seated between the washer 51 and the stem 53.

A combined relief and by-pass valve assembly 54 is provided for controlling flow between the chambers 23 and 26 for the same purpose described hereinabove. This assembly includes a valve head 55 with a flat top wall 55a underlying the diaphragm 52 and receiving the stem 53 through the central portion thereof. The top 55a is secured to the stem 53 as by welding, brazing or the like. The central portion of the diaphragm 52 is thus clamped between the top wall 55a of the valve head and the washer 51.

The valve head has a depending side wall or skirt 55b extending downwardly from the top wall 55 thereof and terminating in a beaded rim 55c seating on the valve seat 27. The side wall 55b is apertured as at 55d to provide for the by-passing of fluid through the valve.

A diaphragm-type by-pass valve is provided for controlling flow through the apertures 55d. This diaphragm by-pass valve is composed of a rubber skirt or sheet 56 lining the inside surface of the valve head 55 and centrally apertured to receive the valve stem 53 therethrough. The skirt 56 preferably has a bead or flange 56a around the aperture therein.

The stem guide 30, as in the modification described in Figures 1 to 3, projects into the chamber 23 and does not interfere with the seating of the valve head 55 because the head is hollow and its top wall is spaced from the top edge of the guide. The top end of the guide is provided with a shoulder 30a receiving a spring 57 for holding the by-pass valve skirt 56 against the valve head 55. This spring includes a centrally apertured portion 57a seated on the guide 30. Fingers 57b extend upwardly from the portion 57a to underlie the top portion of the skirt 56 and to engage the flange or bead 56a for sealingly clamping the skirt to the stem 53. A plurality of spring fingers 57c depend from the spring portion 57a and act against the lower portion of the skirt 56 to hold the skirt against the side wall 55b of the valve head 55 for sealing the apertures 55d.

The dome or high hollow head of the valve assembly 54, like the domed valve head 41, accommodates increased bearing length for the stem guide 30 without increasing the overall height of the assembly so that the valve stem 53 is better held against cocking to maintain the valve head 55 in position for efficient seating on the seat 27. When intake pressure exceeds discharge pressure by a predetermined differential, the spring fingers 57c will be deflected to allow the rubber by-pass valve skirt 56 to move away from the apertures 55d thereby permitting fluid flow through the valve head 55.

In the modification shown in Figures 5 and 6, parts identical with parts described in connection with Figure 4 have been marked with the same reference numerals.

As shown in Figures 5 and 6, the spring 39 is bottomed on a retainer 60 with a depressed central portion 60a providing a rounded projection on the bottom of the retainer. A washer 61 overlies the central portion of the diaphragm 62 and has a depressed central dimple 61a rockably receiving the projection 60a of the retainer therein.

A valve stem 63 is slidably mounted in the guide 30 and has a rounded depressed upper end 63a. The central portion of the diaphragm 62 is depressed by the portion 61a of the washer 61 into the recessed top wall 63a of the stem 63. In this arrangement, therefore, the washer 61 is centered on the diaphragm by providing a projection thereon which deforms the central portion of the diaphragm as at 62a into a recess 63a in the upper end of the valve stem 63. The spring retainer 63 can rock in the dimple provided by the projection 61a of the washer 61 without imparting rocking movements to the diaphragm, or washer.

A combined relief and by-pass valve assembly 64 is provided for the purpose described hereinabove. This assembly includes a relief valve head 65 with a flat top wall 65a underlying the central portion of the diaphragm 62 and having a central aperture bounded by a depending collar 65b receiving the valve stem 63 therethrough and secured to the valve stem as by welding, brazing or the like. The collar 65b has an outturned flange 65c at its lower end.

The valve head 65 has a side wall or skirt 65d and a rounded rim end 65e providing a seating face for the valve. The side wall 65d has apertures 65f therethrough spaced at intervals therearound adjacent the rim end 65e.

A diaphragm type by-pass valve is provided for lining the valve head 65. This valve is composed of a rubber sheet or skirt 66 with a central aperture surrounded by a bead 66a seated in the recess around the collar 65b and bottomed on the flange 65c of the valve head. The bead 66a snugly fits in the recess in sealing engagement with the valve head.

The skirt 66 has a plurality of flapper segments 66b lining the side wall 65a of the valve head. As shown in Figure 6, these segments 66b are so positioned as to cover the apertures 65f in the side wall of the valve head.

A spring member 67 is mounted in the diaphragm 66 and includes an aperture top wall portion 67a surrounding the bead 66a of the diaphragm and cooperating to hold the bead in the recess afforded by the collar 65b and the flange 65c. A plurality of spring fingers 67b depend from the top wall portion 67a to act on the flappers 66b of the diaphragm for holding the flappers in sealing relation with the apertures 65f. The fingers 67b are adapted to be deflected to permit the flappers 66b to uncover the apertures 65f and accommodate flow of fluid from the chamber 23 to the chamber 26 even when the valve head 65 is seated on the seat 27. As in the other embodiments, the stem guide 30 projects into the hollow head of the valve to have an increased bearing length for the stem without increasing the overall height of the assembly.

From the above descriptions it will be clear that the invention provides compact combined valve assemblies controlling flow of fluids in opposite directions with one of the valves having a hollow head or dome accommodating therein a stem bearing guide and with the other of the valves controlling flow through the head of the first valve by means of spring pressed diaphragm skirts.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A combination relief and by-pass valve assembly which comprises a rigid relief valve head having a hollow dome with a seating face therearound, a valve stem depending from the apex of the dome of said head, a valve stem guide slidably supporting said stem and projecting into the head beyond the seating face of the head, said head having apertures therein, a flexible liner in said head covering said apertures, and deflectable spring means yieldingly holding the liner against the head to seal the apertures.

2. A combination two-way fluid flow control valve assembly comprising a first valve member having a hollow dome head and a central depending stem, said valve head having a seating face therearound intermediate the ends of the stem, a stem guide slidably receiving said stem and projecting into said head beyond the seating face thereof into spaced relation from the apex of the head, said head having a passage therethrough, a second valve in said head controlling flow through said passage, said second valve including an impervious flexible liner in the head, conforming to the contour of said head, a plurality of arcuate spring fingers urging the liner into sealing engagement with the head, and said second valve being movable with the first valve and deflectable away from the valve head to open the passageway.

3. A combined by-pass and relief valve comprising a hollow domed relief valve head having a seating face therearound, said head having passageways therethrough, a flexible diaphragm type by-pass valve lining said head for sealing said passageways, and bowed spring fingers mounted in said head and acting on said diaphragm to urge the diaphragm into sealing relation with the head.

4. A combined by-pass and relief valve which comprises a relief valve head member having a seating face therearound and apertures therethrough, a hollow closed bottomed open topped stem secured to the relief valve member and depending therefrom, a spring-pressed rod projecting freely through the relief valve member into the hollow stem and seated on the bottom of the stem, and a spring-pressed diaphragm liner on said relief valve member controlling fluid flow through the apertures therein.

5. A combined relief and by-pass valve assembly for pumps and the like which comprises a domed head having a seating face therearound spaced axially from the apex of the dome, said head having an aperture through the apex thereof and additional apertures therearound between the seating face and the apex, a hollow open-topped closed-bottomed stem secured to the head around the aperture in the apex thereof and depending through the head into spaced axial relation beneath the seating face of the head, a spring-pressed rod projecting freely through the aperture in the apex of the head into the hollow stem and bottomed on the bottom of the stem for urging the valve seating face into closed position, flexible impervious material lining the head for closing the apertures between the aperture in the apex and the seating face of the head, and yieldable spring means holding said liner in sealing relation with said head to close the apertures.

6. A combined relief and by-pass valve assembly comprising a relief valve head having a depending skirt therearound with a rim end providing a valve seating face, said skirt having apertures therein, a stem secured to the top of the head and depending therefrom beneath the rim end of the skirt, guide means slidably supporting said stem and projecting into the skirt of the head in spaced relation therefrom for increasing the guide length to hold the head against cocking without increasing the overall height of the assembly, and spring-pressed means in the head acting on the skirt to seal the apertures, said means including a deflectable diaphragm lining said skirt and elongated flat springs urging said diaphragm radially outwardly against said skirt, said diaphragm being adapted to be deflected from the skirt for accommodating fluid flow through the apertures of the head.

7. A combined relief and by-pass valve assembly comprising a relief valve member having an apertured depending skirt with a rim end affording a seating face, flexible material lining said head to cover the apertures in the skirt, and yieldable spring means in extended surface engagement with the inner surface of said flexible material directly urging said lining against said skirt to yieldably hold the same in sealing engagement with the skirt.

8. A combined relief and by-pass valve assembly comprising a relief valve head having a depending skirt with a rim end providing a seating face for the relief valve, a stem depending from the top wall of the head in fixed relation to the head, a stem guide slidably supporting said stem and projecting into the head to increase the bearing support for the stem without increasing the overall height of the assembly, a flexible liner in said head abutting the inner surfaces of said skirt, and arcuate elongated springs seated on said guide to directly abut said liner, said skirt of the head having apertures therethrough covered by said liner and said spring means being arcuately deflectable to yieldably hold the liner for sealing the apertures and for receding from the skirt to accommodate fluid flow through the apertures.

9. A combined relief and by-pass valve assembly comprising a hollow relief valve head having apertures therein, flexible flapper members in said head closing said apertures, flexible flat springs in flatwise contact with said flapper members to urge said members against said valve head, and guide means slidably mounting said head.

10. A combined relief and by-pass valve assembly comprising a rigid valve head having a top wall and a depending skirt therearound with a rim end providing a seating face, said skirt having apertures therethrough, a liner in said head having flapper segments acting on the skirt to close said apertures, and a spring member carried by the top wall of the head having deflectable fingers acting on said flappers to yieldably urge the same into sealing relation with the skirt for sealing the apertures.

11. A combined relief and by-pass valve assembly for pumps and the like which comprises a spring-pressed diaphragm, a rod extending through said diaphragm and having a flange-defining member thereon underlying the diaphragm, a relief valve having a hollow guide stem receiving said rod freely therethrough and seating the rod on the bottom of the stem, said relief valve having a domed head secured to said stem and providing a seating face around the stem intermediate the ends thereof, a stem guide slidably receiving the stem and projecting into the domed head, impervious sheet material lining said domed head, a radially deflectable spring underlying the sheet material to urge the sheet material into sealing engagement with the domed head, a coil spring surrounding the stem guide acting on said radially deformable spring to urge the spring against the top of the domed head, and said domed head having apertures therethrough accommodating fluid flow when the coil spring and the radially deformable spring permit movement of the liner away from the head to uncover the apertures.

12. A combined relief and by-pass valve assembly for pumps and the like comprising a spring-urged diaphragm, a relief valve head having a flat top wall underlying said diaphragm, a valve stem projecting through said flat top wall and having a rounded upper end depressing the diaphragm away from the top wall of the head, a washer member having a recess receiving the deformed portion of the diaphragm and confining the diaphragm portion between the stem and the washer, a spring retainer rockably mounted on the washer, said top wall of the head having a depending apertured skirt portion with a rim bottom providing a valve seating face, and spring-pressed flexible lining material in said valve head sealing said apertures and adapted to be radially deflected from the valve head for by-passing fluid through the relief valve.

13. A combined by-pass and relief valve assembly for pumps and the like which comprises a relief valve head having a central recess in the top thereof and a stem depending therefrom, a diaphragm overlying the top of said head, means having a projection thereon overlying the diaphragm and deforming a portion of the diaphragm into the recess, said valve head having an apertured side wall, and a spring-pressed liner in said head closing the apertures in said side wall and adapted to be deflected radially away from the side wall to by-pass fluid through the head.

14. A valve assembly comprising a valve seat, a stem guide extending through said seat, a valve having a head with a seating face therearound, and a stem extending into and depending from said head to extend on both sides of a transverse plane through said seating face, said stem guide slidably receiving said stem and having increased bearing engagement therewith due to the extension of the guide through the valve seat and the extension of the stem into the valve head beyond a transverse plane through the seating face.

15. A valve assembly comprising a relief valve head having a hollow dome with a seating face therearound, a valve stem depending from the apex of the dome of said head, a valve seat accommodating said seating face, and a valve stem guide extending through said seat slidably supporting said stem and projecting into the dome of said head beyond the seating face of the head when said seating face is seated on the valve seat.

16. A valve assembly comprising a rigid valve head having a peripheral seating face and a central depending stem, said valve head having a recess therein surrounding the valve stem and adapted to accommodate a valve stem guide freely therein, said head having apertures therethrough communicating with said recess between the peripheral seating face thereof and the valve stem, and a flexible liner for said valve head seated in said recess and disposed around the valve stem, said liner following the contour of said recess and adapted to seal the apertures in the valve head when pressure in the recess is greater than pressure surrounding the outer face of the valve head and adapted to be deflected radially inwardly away from the valve head to uncover the apertures in the valve head and accommodate fluid flow passage through the valve head when the pressure on the outer face of the valve head is greater than the pressure in the recess.

17. In a combined relief and by-pass valve for a fluid pump including a casing having a first chamber for connection to the intake side of the pump and a second chamber for connection to the discharge side of the pump, the improvement which comprises means in said casing defining a valve seat between said chambers, a valve head having an apertured dependent skirt defining a peripheral seating face for engagement with said valve seat, means guiding said valve head for axial opening movement to relieve excessive discharge pressure in said chamber, a deflectable lining for said skirt, and deflectable spring fingers normally urging said lining against said skirt to close said skirt apertures while allowing by-passing of fluid from said first chamber through said skirt apertures against the action of said spring fingers into said second chamber.

THEODORE R. THOREN.
LESLIE L. ASPELIN.

REFERENCES CITED

The following references are of record in the file of this patent:

UNITED STATES PATENTS

| Number | Name | Date |
| --- | --- | --- |
| 455,633 | Messinger | July 7, 1891 |
| 526,177 | Blair | Sept. 18, 1894 |
| 2,236,477 | Fuchs | Mar. 25, 1941 |
| 2,345,547 | Roth | Mar. 28, 1944 |
| 2,375,077 | Caserta | May 1, 1945 |
| 2,423,281 | Aspelin | July 1, 1947 |

FOREIGN PATENTS

| Number | Country | Date |
| --- | --- | --- |
| 5,885 | Germany | Dec. 24, 1878 |